(12) United States Patent
Amith

(10) Patent No.: US 6,363,337 B1
(45) Date of Patent: Mar. 26, 2002

(54) TRANSLATION OF DATA ACCORDING TO A TEMPLATE

(75) Inventor: Aviel Amith, Holon (IL)

(73) Assignee: Universal AD Ltd., Holon (IL)

( * ) Notice: Subject to any disclaimer, the term of this patent is extended or adjusted under 35 U.S.C. 154(b) by 0 days.

(21) Appl. No.: 09/232,678

(22) Filed: Jan. 19, 1999

(51) Int. Cl.[7] ........................... G06F 17/28; H04M 1/64
(52) U.S. Cl. ............................................. 704/7; 379/67
(58) Field of Search ................................ 704/1, 2–7, 8, 704/277; 379/67, 88.05; 707/530, 536

(56) References Cited

U.S. PATENT DOCUMENTS

| | | | | |
|---|---|---|---|---|
| 4,829,423 A | * | 5/1989 | Tennant et al. | 704/9 |
| 4,980,829 A | * | 12/1990 | Okajima et al. | 704/2 |
| 5,091,931 A | * | 2/1992 | Milewski | 379/67 |
| 5,442,546 A | * | 8/1995 | Kaji et al. | 704/2 |
| 5,523,943 A | * | 6/1996 | Maruta et al. | 704/4 |
| 5,524,137 A | * | 6/1996 | Rhee | 379/67 |
| 5,535,120 A | * | 7/1996 | Chong et al. | 704/3 |
| 5,687,383 A | * | 11/1997 | Nakayama et al. | 704/2 |
| 5,848,386 A | * | 12/1998 | Motoyama | 704/5 |
| 6,119,078 A | * | 9/2000 | Kabayakawa et al. | 704/3 |

FOREIGN PATENT DOCUMENTS

| | | | | |
|---|---|---|---|---|
| EP | 0 399 533 A | | 5/1990 | G06F/15/38 |

OTHER PUBLICATIONS

Isahara et al, "Analysis, generation and Semantic Representation in CONTRAST–A Context–Based Machine Translation System", *Systems and Computers in Japan*, 26(4):37–53, 1995.

"Ambiguity Memory", IBM Technical Disclosure Bulletin, 36(8):229–230, 1993.

Nonnenmann et al, "Software Testing with Kitss", *IEEE Expert*, 8(4):25–30, 1993.

* cited by examiner

*Primary Examiner*—Patrick N. Edouard
(74) *Attorney, Agent, or Firm*—Mark M. Friedman

(57) ABSTRACT

A method for automatically translating data into different human languages and into different media formats. The method of the present invention uses a template for decomposing the data into at least one data element, predetermined according to a human language subject area. Each such subject area has a limited vocabulary and contains a limited number of concepts. The data is then entered, manipulated and stored according to the template. Since the structure of the data is predetermined according to subject area, the data is relatively easy to translate into different human languages according to such a limited vocabulary. The data is also relatively easy to translate into different media formats, such as facsimile transmission, e-mail and voice messages, for example. Thus, the method of the present invention easily and efficiently translates data into different human languages and into different media formats.

2 Claims, 2 Drawing Sheets

TRANSLATION OF DATA ACCORDING TO A TEMPLATE

FIELD AND BACKGROUND OF THE INVENTION

The present invention relates to a template for receiving, characterizing and storing data, and in particular for translating data into different languages and/or different media formats according to such a template.

As the market for commerce of consumer goods expands internationally so does the need for advertising in a multiplicity of languages and formats. Today, with the advent of electronic mediated commerce, consumer markets are no longer defined by countries or regions but rather by a specific and targeted sector which can be composed of consumers of many different nationalities. As such, advertisers are forced to provide advertisements in formats and languages suitable to a heterogeneous mix of consumers.

One such international consumer market is emerging with the creation of the European Union. With the advent of unrestricted trade, advertisers are now confronted with the task of producing a multiplicity of printed and electronic ads that suit the specific languages and formats recognized by the different nationalities comprising this new multilingual market. Presently, the production of such ads can be time consuming and expensive and so multilingual ads are limited to big budget advertisement campaigns.

The rapid growth and the world wide acceptability of the Internet and the World Wide Web is responsible for another fast growing international consumer market.

As the Internet grows, many Web sites are becoming accessible internationally with many more computer users accessing these Web sites, seeking information and/or commercial products. However, the increased connectivity between users in different countries has also exposed the problem of communication between such users. Simply providing the communication channel, such as the World Wide Web, is not sufficient to guarantee communication. Users must also be able to understand each other in terms of the human language used for the Web page. Although English is currently the dominant language on the World Wide Web, many different Web browsers are now available for serving Web pages in different languages. However, creating a Web page in many different human languages is currently a difficult and time consuming task when performed manually. Thus, there is a need for automation of the translation of Web pages into different human languages.

One attempt to meet this need for translation has been to create automatic translation software for human languages. Such software receives information from an electronic document such as an advertisement in one human language, and then attempts to automatically translate the document into a different human language. The drawback of such software is that it tries to provide maximum flexibility by receiving any type of language data, which renders automatic translation of the data far more difficult. Human languages are complex, with a good deal of information being understandable only in context and without rigid structural rules. Thus, translations provided by currently available automatic translation software must be examined carefully for errors in the translation which arise from irregularities of human language.

Such automatic translation software would be far more accurate, and would perform more reliably without such a need for careful examination, if the human language data could be provided in a more limited format. Frequently, data presented as advertisement for example on a web page is limited in terms of the vocabulary and subject matter discussed, and as such would be relatively easier to translate if these limitations were recognized by the software. Unfortunately, there is no currently available software which is able to both recognize and to exploit these limitations in order to provide a more accurate translation of the data into a different human language.

In addition, translation of data into different media formats, such as facsimiles, electronic mail (e-mail), voice messages and the like, is also currently difficult to perform automatically. For example, currently the text of an advertisement cannot easily be translated into a voice message which could be provided to a user through the telephone. Similarly, a user cannot submit data through a telephone call to an automated service, and then have this data sent as a facsimile or as an e-mail message. Thus, no software is currently available which can translate data automatically into different media formats.

Such translations into different media formats would be highly useful for disseminating advertisements, for example, in which the type of language data is likely to be highly restricted. For example, currently a user can place an advertisement in a newspaper in a single human language by calling the newspaper and giving the details over the telephone. The advertisement then appears in a single media format, the newspaper. The user cannot easily have the advertisement translated into different languages, nor can the user have the advertisement translated into multiple media formats. Thus, the translation of data into different media formats and into different human languages cannot currently be performed automatically by available software.

There is thus a need for, and it would be useful to have, software for automatic translation of data presented in a fixed format into different languages and into different media formats.

SUMMARY OF THE INVENTION

The present invention is of a method for automatically translating data into different human languages and into different media formats. The method of the present invention uses a template for decomposing the data into at least one data element, predetermined according to a human language subject area. Each such subject area has a limited vocabulary and contains a limited number of concepts. The data is then entered, manipulated and stored according to the template. Since the structure of the data is either predetermined or processed according to subject area, the data is relatively easy to translate into different human languages according to such a limited vocabulary. The data is also relatively easy to translate into different media formats, such as facsimile, e-mail and voice messages, for example. Thus, the method of the present invention easily and efficiently translates data into different human languages and into different media formats.

Although the term "translation" is used herein, it should be understood that the translation could also be performed as a conversion, by storing the information according to generic codes in the database, such as unicode for example, and then by converting the generic code to human language data in the desired human language and media format.

According to the present invention there is provided a method for automatically translating human language data of a subject area according to a template, the steps of the method being performed by a data processor, the method comprising the steps of: (a) subdividing the subject area into at least one data element to at least partially form the template; (b) identifying information in the human language data corresponding to the at least one data element; and (c) translating the information in the at least one data element according to the template to form translated information.

Preferably, the method further includes the step of: (d) storing the information in the at least one data element. More preferably, step (a) further comprises the steps of: (i) determining an associated vocabulary for the at least one data element according to the subject area; and (ii) determining an associated concept base for the template according to the subject area. Most preferably, step (c) is performed by at least translating the information in the at least one data element from a first human language to a second human language according to the vocabulary and the concept base.

Preferably, the concept base determines a role for each word of the vocabulary, such that the word has a limited set of definitions for the template. More preferably, the information is interpreted to be associated with the at least one data element according to the role. Most preferably, the method further includes the step of: (d) displaying the information according to the at least one data element to determine if the association between the information and the at least one data element is correct. Even more preferably, the method further includes the step of: (e) searching the information according to a data type selected from the group consisting of the data element, the role and the concept base.

Preferably, the information is defined as belonging to the at least one data element according to a fixed format for entering the information. Also preferably, the information is stored as a non-word symbol, such that the step of translation includes a step of conversion of the non-word symbol to a word. More preferably, the method further includes the step of: (d) generating an output of the translated information. Most preferably, step (c) is additionally performed by translating the information from a first media format into a second media format according to the template, such that step (d) is performed by displaying the translated information in the second media format. Preferably, the second media format is selected from the group consisting of a Web page, an electronic mail (e-mail) message, a facsimile transmission and a voice message. Preferably, step (c) is performed by at least translating the information from a first human language into a second human language according to the template, such that step (d) is performed by displaying the translated information in the second human language.

According to another embodiment of the present invention, there is provided a method for automatically translating human language data entered by a user to form translated information according to a template, the steps of the method being performed by a data processor, the method comprising the steps of: (a) entering the human language data contained in a subject area by the user according to an entry format; (b) subdividing the subject area into at least one data element to at least partially form the template; (c) identifying information in the human language data corresponding to the at least one data element; and (d) translating the information in the at least one data element according to the template to form the translated information.

Preferably, the entry format is a fixed format, such that the information corresponding to the at least one data element is entered in a fixed location of the entry format, and such that step (c) is performed by identifying the information according to the fixed location of the entry format.

Also preferably, the human language data is entered in the entry format as a type of data selected from the group consisting of: vocal data, printed data and electronic data.

According to another preferred embodiment of the present invention, step (b) further comprises the steps of an (i) determining an associated concept base for the template according to the subject area; and (ii) determining an associated vocabulary for the at least one data element according to the subject area. Preferably, the concept base determines a role for each word of the vocabulary, such that the word has a limited set of definitions for the template.

According to a preferred embodiment of the present invention, the entry format is a free format, such that the information corresponding to the at least one data element is entered in substantially any location of the entry format, and such that step (c) is performed by interpreting the information according to the role. Preferably, the method further includes the step of: (d) displaying the information identified according to the at least one data element to the user for determining if the association between the information and the at least one data element is correct. More preferably, the information is displayed in an output format selected from the group consisting of: vocal data, printed data and electronic data.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Universal Resource Locator). Hereinafter, the term "Web site" refers to at least one Web page, and preferably a plurality of Web pages, virtually connected to form a coherent group.

Hereinafter, the term "computer" includes, but is not limited to, personal computers (PC) having an operating system such as DOS, Windows™, OS/2™, Linux or BeOS; Macintosh™ computers; computers having JAVA™ ™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "user" is the person who operates the Web browser or other GUI interface and navigates through the system of the present invention.

Hereinafter the term "human language" refers to natural language.

The steps of the method of the present invention could be described as instructions being performed by a data processor, such that the present invention could be implemented as hardware, firmware, software or a combination thereof.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE INVENTION

The present invention is of a method for automatically translating data into different human languages and into different media formats. The method of the present invention uses a template for decomposing the data into at least one data element, predetermined according to a human language subject area. Each such subject area has a limited vocabulary and contains a limited number of concepts. The concept associated with each template effectively limits the definitions of the words in the vocabulary to certain "roles", such that each such vocabulary word can have a limited set of definitions which are permissible for that template.

The data is then entered, manipulated and stored according to the template. Since the structure of the data is predetermined according to subject area, the data is relatively easy to translate into different human languages according to such a limited vocabulary. The data is also relatively easy to translate into different media formats, such as facsimile, e-mail and voice messages, for example. Thus, the method of the present invention easily and efficiently translates data into different human languages and into different media formats.

The principles and operation of a method for automatically translating data into different human languages and into different media formats according to the present invention may be better understood with reference to the drawings and the accompanying description, it being understood that these drawings are given for illustrative purposes only and are not meant to be limiting.

Figure 1:
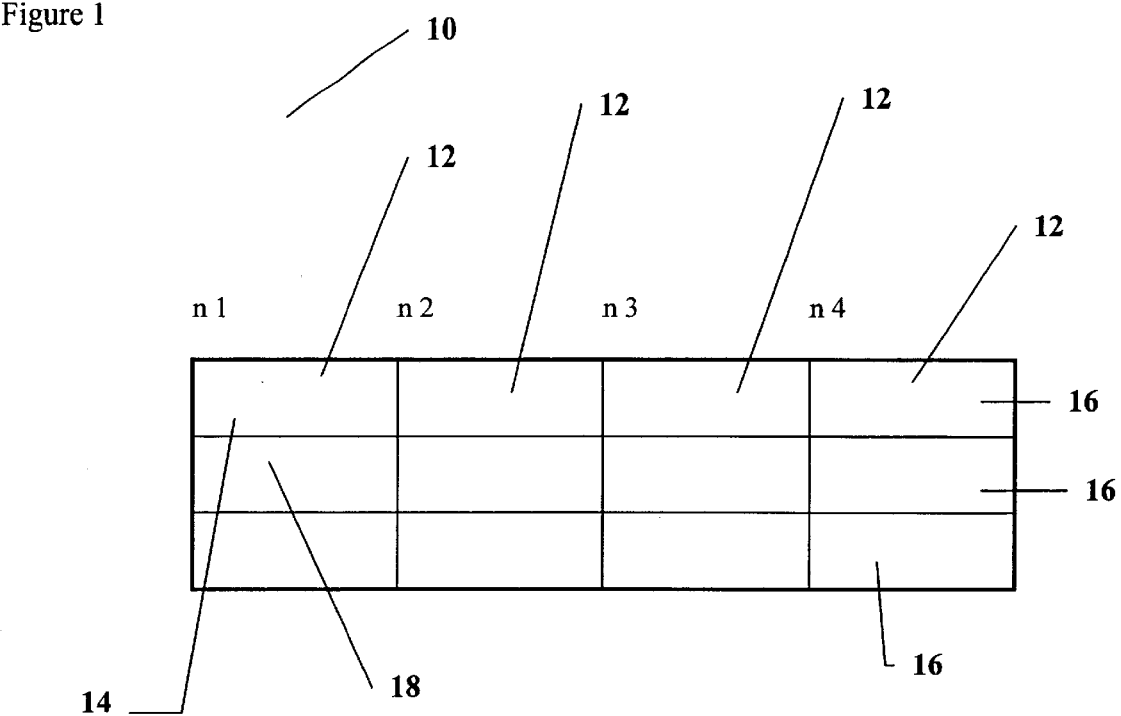
FIG. 1 is a schematic block diagram of an illustrative restricted format for data entry, manipulation and storage according to the present invention.

Referring now to the drawings, FIG. 1 is a schematic block diagram of an illustrative template for data entry, manipulation and storage according to the present invention. As defined herein, the term "template" refers to a format which can only accept human language data in one or more predetermined subject areas, although the data can be in substantially any type of media format upon entry. As shown below in FIG. 1, the template of the present invention accepts each separate data entry of human language data as one or more data elements. Each data element corresponds to a subject area in which the template is able to accept human language data. Each template has a predetermined associated concept base, while each data element has an associated vocabulary, such that the data element must include a word or words in the associated vocabulary, and such that the definition(s) of each word is determined by the associated concept base according to a role for each word.

The exemplary template of the present invention is shown in the form of a table 10, it being understood that this is for the purposes of illustration only and is not meant to be limiting in any way. Table 10 features a plurality of columns 12, of which four are shown for the purposes of illustration only. Columns 12 are labeled as "column 1", "column 2", "column 3" and "column 4" for the purpose of illustration only and without intending to be limiting in any way. Table 10 also features a plurality of rows 16, of which three are shown for the purpose of illustration only. Rows 16 are labeled as "row 1", "row 2", and "row 3" for the purpose of illustration only and without intending to be limiting in any way. Columns 12 and rows 16 divide table 10 into a plurality of cells 14.

Each column 12 is identified as containing information related to a single type of data element for which information can be found in that particular column 12. Each row 16 is identified as containing information related to a single data entry for which information can be found in that particular row 16. For example, cell 18 would be expected to contain information from the data entry contained in row 2 for the type of data element contained in column 1. The identifying information itself for the data entries and the type of data elements is optionally stored separately. Thus, template 10 permits the human language data in each data entry to be decomposed into one or more data elements which is restricted to a single subject area.

One example of human language data which could be entered into template 10 is the data required for advertising an automobile "for sale". The seller wishes to communicate the make and model of the automobile, the color of the automobile, the model year, the condition of the automobile and the number of kilometers which the automobile has traveled, or the "mileage". This information could easily be decomposed into the following data elements: make, which is the name of the manufacturer of the automobile; model, which is usually the name of the particular type of automobile as a character string optionally including numerals; color, such as red, blue, green and so forth; model year, which is the year in which the automobile was manufactured; condition, such as "good", "some rust" and so forth; and the mileage, which is a number.

As an example, the associated vocabulary for the data element "color" would therefore preferably include all or substantially all names of colors, or at least those names determined to be relevant. The associated concept base for template 10 would determine that each name of a color would be for the visual appearance of the paint finish on the body of the automobile, for example, thereby defining the role of each word in the vocabulary.

With regard to FIG. 1, each of these data elements would become the heading for a column 12 of template 10. Each piece of information corresponding to a data element would be stored in the relevant cell 14 under that column 12. For example, the character string "blue" would be stored under the column 12 for "color". Alternatively, rather than storing the character string "blue" itself in the relevant cell 14, a symbol would be stored in cell 14. For example, the symbol could be a number or other identifier, indicating that the information for that data element of that data entry corresponds to the character string "blue". Thus, all of the information would be decomposed and stored as data elements in template 10.

Preferably, data elements which contain numeric information, such as the model year, are examined according to a validation rule, which indicates the permitted value or range of values which may be associated with that data element.

Of course, the data could be stored as data elements in many different storage formats, and not simply the table shown as template 10. For example, the data could be stored in a relational database rather than as a flat file. However, the depiction of template 10 as a table illustrates the underlying concept, which is that the complex data is decomposed into simpler, predefined data elements. Such simpler elements also have the advantage of being easier to manipulate, for example to search, sort, filter and/or categorize the data.

These elements are then translated, into a different human language or a different media format, or both. Optionally and preferably, the translation could also include conversion of units of measure, such as temperature, weight, time, units of currency and distance for example.

Preferably, a special template 10 would be designed for each subject area of interest, such as advertisements, schedules for airlines, trains or other transportation, or for substantially any type of data which can be decomposed into simpler elements. More preferably, each subject area would be subdivided into separate concepts, each concept featuring a particular aspect of the subject area, such as "automobile advertisements" in the "advertisement" subject area. Each concept would then preferably correspond to a template.

Optionally and preferably, each template 10 would be stored with information related to that particular template 10, including but not limited to, a textual description of the concept for template 10, a location of the information related to template 10 in an overall hierarchy for that particular subject area, and one or more permitted interfaces for receiving information from the user and for displaying information to the user. Such interfaces preferably include, but are not limited to, facsimile, e-mail, Web page, voice message and so forth.

Figure 2:
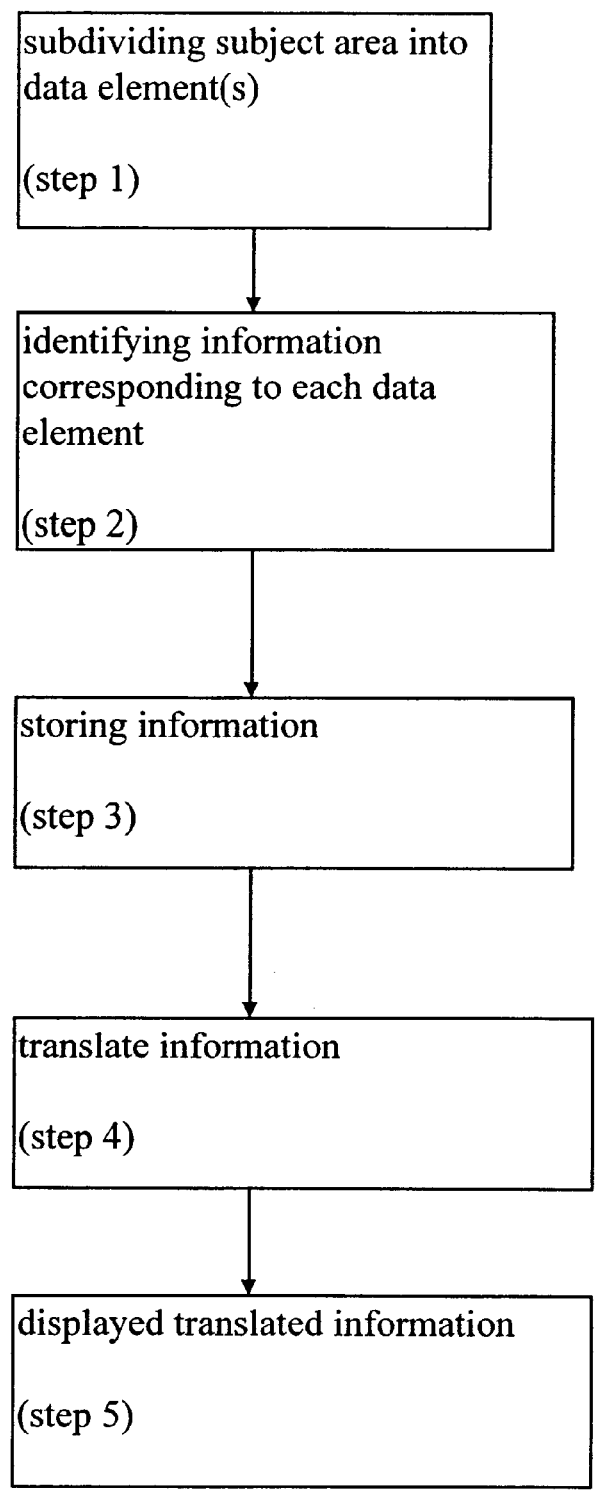
FIG. 2 is a flowchart of the method for automatic data translation according to the present invention.

The method of the present invention, including translation, is shown as a flowchart in FIG. 2. In step 1, the template is at least partially formed by dividing the human language subject area into one or more data elements. Each template has an associated concept base. Each data element has an associated vocabulary and role determined according to the concept base as described for FIG. 1. Thus, this step also preferably includes the steps of determining the associated concept base for each template and the associated vocabulary for each data element.

In step 2, the human language data is received, and the information corresponding to each data element is identified. For example, if the data is received as a voice or written text message, and the user states or writes the phrase "a blue car", then the string "blue" is the information corresponding to the data element "color of automobile". One advantage of the template according to the present invention is that it minimizes the amount of voice data which must recognized as words for the data element. Optionally and preferably, the user would be required to give an additional non-voice indication of the information being entered, such as being requested to press a particular key on a touch-tone telephone keypad before stating the color of the automobile for example. In step 3, this information is preferably stored according to the data element.

In step 4, the information corresponding to one or more data elements is translated, either into a different human language or into a different media format, or both as previously described. For example, if the data is received as a voice message in English, the information could be translated into an e-mail message in French. As another example, the data could be present on a Web page in Japanese, and could then be translated into another Web page in Italian.

In step 5, preferably the translated information is displayed to the user, such that the user can view the information, for example as an e-mail message, facsimile transmission, vocal or text-based message delivered through a telephone, including a cellular telephone, or a paging device, and so forth.

In another implementation of the method according to the present invention, in a first step a human language data is entered either in a fixed entry format or a "free" entry format. The fixed format requires information corresponding to each type of data element to be entered in a fixed location of the entry format. For example, the fixed format could be a Web page with a set of fields, each field corresponding to one type of data element. Such a fixed format has the advantage of ease of identification of information corresponding to each data element, since such information is simply obtained from the corresponding field of the entry format.

Alternatively, the free format permits inexact data such as a string of words or simply as a sentence such as "a 1996 Mazda™ for sale, red, 22,000 km". Optionally, along with the data submission the user also defines the subject area according to a second input, such as in this case, "Car for sale". This submission, can be effected by a mechanism including, but not limited to, vocal or a menu selection. Preferably, the subject area is determined by the data processing unit by analysis of the human language data received from the user.

In a second step, the inexact input data is processed so as to subdivide the sentence into individual words or word sets in which individual words and relationships between words can be examined by the processor. In this sense the data retrieved is interpreted to disclose the nature and content of the input data. For example, the sentence "a 1996 Mazda™ for sale, red, 22,000 km" is subdivided into multiple sets, these sets include a single word or various combinations of words such as for example, "1996" "Mazda™" "Mazda™ for sale" "Mazda™ red" "22,000 km" and so on such as data from individual words or word strings can be processed. According to this information or according to a user defined input, a template of data elements from a predefined subject area is implemented so as to define and preferably store the interpreted information extracted from the subdivided data set.

Such a template is preferably then used in conjunction with a template interpreter, in order to process such "inexact" data. The data can be described as "inexact" in that the user is not limited to a particular form or format for entering the data, such that the user can enter the information corresponding to each data element in substantially any location of the entry format. Therefore, the interpreter must interpret the data according to the subject area, the concept and concept base associated with the template and the vocabulary associated with the concept base. Preferably, the interpreter actually interprets the data first according to keywords, which are abstracted from the data. Next, each keyword is preferably associated with a "role" according to the concept base associated with the template, which is limited according to the subject area of the template.

Following this step, preferably the processed data is displayed to the user before the step of translation is implemented, so as to allow the user to verify the information and to edit incorrect entries if necessary before the data is translated into another language or to another media format. This configuration then follows steps 4 and 5 as described hereinabove.

Optionally and preferably, the user can request to search through the information stored by the template by keyword to obtain information of interest, or to sort or filter the information by data element, processes which are greatly simplified by the predetermined structure of the template. Also optionally and preferably, keyword(s) for such searches can be derived from the identification information for each data element, such as the word "color" to identify a data element related to the color of the automobile for example.

More preferably, the data elements can be filtered according to the concept or concepts associated with the template. Most preferably, the data elements can be filtered according to the role or roles associated with the vocabulary word or words for the template. Thus, preferably a hierarchy of data structures exist for the human language data which are associated with the template, such that the user may search according to substantially level of the hierarchy, and not simply for the keywords themselves.

According to another preferred embodiment of the present invention, the information associated with each data element is stored as a number or other non-word symbol, rather than as the actual words. Such storage is easier to translate into different languages, for example, since each identifying symbol is associated with a word or words in many different languages. For example, the user could optionally use the word "blue" in English to enter information for an automobile advertisement. Preferably, this word would be stored as a symbol of some type, such as the number "12". If the advertisement is then translated into French, the symbol would be matched to the equivalent word in French, "bleu", rather than directly translating the word "blue" into the word "bleu". Thus, the method of the present invention preferably performs the process of translation into a different language as a process of conversion, rather than direct translation from the word(s) of a first human language into the word(s) of a second human language.

According to yet another preferred embodiment of the present invention, the input (entry) and output (display) formats for the human language data are optionally adjusted to help a user who has difficulty with sight or hearing. For example, for a user with difficulty seeing human language data, the output format could be a voice message or a document in Braille. For a user with difficulty hearing, all voice data could be presented in a textual format, for example. Thus, the present invention permits the formats for data entry and display to be adjusted according to the individual needs of the user.

It will be appreciated that the above descriptions are intended only to serve as examples, and that many other embodiments are possible within the spirit and the scope of the present invention.

What is claimed:

1. A method for automatically translating human language data of a subject area according to a template, the steps of the method being performed by a data processor, the method comprising the steps of:

(a) subdividing the subject area into at least one data element to at least partially form the template and;
  (i) determining an associated vocabulary for said at least one data element according to the subject area; and
  (ii) determining an associated concept base for the template according to the subject area wherein said concept base determines a role for each word of said vocabulary, such that said word has a limited set of definitions for the template;

(b) identifying information in the human language data corresponding to said at least one data element; and (c) translating said information in said at least one data element according to the template to form translated information by at least translating said information in said at least one data element from a first human language to a second human language according to said vocabulary and said concept base;

wherein said information is stored as a non-word symbol, such that the step of translation includes a step of conversion of said non-word symbol to a word;

wherein translating further includes translating said information from a first media format into a second media format according to the template; and (d) generating an output of said translated information by displaying said translated information in said second media format;

wherein said second media format is selected from the group consisting of a Web page, an electronic mail (e-mail) message, a facsimile transmission and a voice message.

2. The method of claim 1, wherein said second media format is said Web page.

* * * * *